(12) United States Patent
Uysal (10) Patent No.: US 7,310,686 B2
(45) Date of Patent: Dec. 18, 2007

(54) APPARATUS AND METHOD FOR TRANSPARENT SELECTION OF AN INTERNET SERVER BASED ON GEOGRAPHIC LOCATION OF A USER

(75) Inventor: Sezen Uysal, Vienna, VA (US)

(73) Assignee: Paxfire, Inc., Herndon, VA (US)

( * ) Notice: Subject to any disclaimer, the term of this patent is extended or adjusted under 35 U.S.C. 154(b) by 543 days.

(21) Appl. No.: 10/065,529

(22) Filed: Oct. 27, 2002

(65) Prior Publication Data

US 2004/0083307 A1   Apr. 29, 2004

(51) Int. Cl.
   *G06F 156/16* (2006.01)
   *G06F 12/00* (2006.01)
(52) U.S. Cl. .......................... 709/245; 707/3
(58) Field of Classification Search ........ 709/200–203, 709/217–219, 245, 228; 707/3
   See application file for complete search history.

(56) References Cited

U.S. PATENT DOCUMENTS

| | | | |
|---|---|---|---|
| 6,304,913 B1 * | 10/2001 | Rune | 709/241 |
| 6,415,323 B1 * | 7/2002 | McCanne et al. | 709/225 |
| 6,718,359 B2 * | 4/2004 | Zisapel et al. | 718/105 |
| 6,757,740 B1 * | 6/2004 | Parekh et al. | 709/245 |
| 6,785,704 B1 * | 8/2004 | McCanne | 718/105 |
| 6,820,133 B1 * | 11/2004 | Grove et al. | 709/238 |
| 6,829,654 B1 * | 12/2004 | Jungck | 709/246 |
| 2003/0182269 A1 * | 9/2003 | Cheshire | 707/3 |

OTHER PUBLICATIONS

On the use performance of content distributin networks, Internet Measurement Conference, SIGCOMM, 2001, ISBN 1-58113-435-5, p. 169-182.*

Cisco DistributedDirector, Delgadillo, K., Cisco IOS Product Marketing, 1999, p. 1-19.*

Enhancing Web User Experience with Global Server Load Balancing, Alteon Web Systems, Inc., White Paper, Jun. 1999, p. 1-7.*

An architecture for WAN Load Balancing, Jingsha He, IEEE, 0-7803-6283-7, 2000, p. 1169-1173.*

Optimizing ISP Networks and Services with DNS Redirection, Alteon Web Systems, Inc., White Paper, Aug. 1999, p. 1-13.*

RFC 1034: Domain Names—Concepts and Facilities, P. Mockapetris, ISI, Nov. 1987.*

RFC 1035: Domain Names—Implementation and Specification, P. Mockapetris, ISI, Nov. 1987.*

On the effectiveness of DNS based server selection, Shaikh, A., et. al., INFOCOM 2001, vol. 3, ISBN 0-7803-7016-3, P. 1801-1810.*

TCP/IP Illustrated, vol. 1: The Protocols, Chapter 14. DNS: The Domain Name System by W. Richard Stevens, Addison Wesley, Dec. 1993.*

* cited by examiner

*Primary Examiner*—Zarni Maung
(74) *Attorney, Agent, or Firm*—Latimer, Mayberry & Matthews IP Law, LLP (57) ABSTRACT

This invention is an apparatus and a method that selects the optimum location of a service on the Internet according to the user's geo-location and the configuration of the invention by transparently altering the DNS messages. In the preferred embodiment, the invention operates at OSI model's data link layer and it is located in front of the DNS server so that it does not require any modification in the existing DNS or IP network setup or on the application servers. It provides a fast and transparent method of locating an Internet service without the overhead of server scripts, HTTP redirects, or extra steps by the user to find the desired location or content.

41 Claims, 6 Drawing Sheets

| BIT LOCATIONS | | | | | | | | | | | | | | | |
|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 |
| DNS QUERY NUMBER (301) ||||||||||||||||
| QR (302) | OPCODE (303) |||| AA (304) | TC (305) | RD (306) | RA (307) | RESERVED (308) |||| RESPONSE CODE (309) ||||
| NUMBER OF ENTRIES IN QUESTION SECTION (310) ||||||||||||||||
| NUMBER OF RESOURCE RECORDS IN ANSWER SECTION (311) ||||||||||||||||
| NUMBER OF NAME SERVER RESOURCE RECORDS IN AUTHORITY SECTION (312) ||||||||||||||||
| NUMBER OF RESOURCE RECORDS IN ADDITIONAL INFORMATION SECTION (313) ||||||||||||||||
| QUESTION SECTION (314) ||||||||||||||||
| ANSWER SECTION (315) ||||||||||||||||
| AUTHORITY SECTION (316) ||||||||||||||||
| ADDITIONAL INFORMATION SECTION (317) ||||||||||||||||

QR : QUERY OR RESPONSE (0 QUERY, 1 RESPONSE)

OPCODE : 0 STANDARD, 1 INVERSE, 2 STATUS

AA : AUTHORITATIVE ANSWER (IF IT IS SET TO 1)

TC : TRUNCATION (IF IT IS SET TO 1)

RD : RECURSION DESIRED (IF IT IS SET TO 1)

RA : RECURSION AVAILABLE (IF IT IS SET TO 1)

| IP ADDRESS (601) | GEO-LOCATION (602) | ASSIGNED SERVER (603) |
|---|---|---|
| ... | ... | ... |
| 10.175.183.32 (604) | Frankfurt (605) | London (606) |
| 10.175.183.33 (607) | Paris (608) | London (609) |
| ... | ... | ... |
| 192.168.25.64 (610) | New York (611) | Washington, DC (612) |
| 192.168.25.65 (613) | Chicago (614) | Washington, DC (615) |
| ... | ... | ... |

FIG 6.

APPARATUS AND METHOD FOR TRANSPARENT SELECTION OF AN INTERNET SERVER BASED ON GEOGRAPHIC LOCATION OF A USER

BACKGROUND OF INVENTION

The Internet, which is a set of loosely connected computer networks, is growing rapidly in terms of geographical coverage, number of users and number of services. It is a new media that is slowly removing the boundaries between all its users around the world.

Applications and services on the Internet are referred by uniform resource locators (URL) such as "ftp://ftp.site/filename", which is an example of a file location in the Internet, or "http://web.site/webpage", which is an example of a web page. However the personal computers (PC) and the servers that host Internet applications communicate by referring to Internet Protocol (IP) addresses of each other, such as 172.168.12.67. PCs hide this complexity by consulting Domain Name Service (DNS), which maps the URLs to IP addresses.

Typically when a user wants to access a service or an URL, it first consults its DNS server to resolve the name of the service to an IP address. If the DNS server does not have that information it consults a root DNS server, a gTLD (generic top level domain) server, then finally the DNS server where the service is located. After user's DNS server obtains the IP address of the service it sends this information to the user and then the user accesses the service.

Since today's users are located around the world and accessing wide Internet services such as web pages with news or weather forecast, service providers need to distribute the content at several geographical locations. Today these locations, also known as mirror sites, are updated with the same information.

In some implementations, while accessing these distributed services, users are asked to choose a mirror site of their choice. In some cases the users may be asked to answer a series of questions such as their country, preferred language, or even the city they live. These steps not only slow the information retrieval process but also frustrate the users. In some other cases, this manual process is automated by the use of "cookies", which are small set of information about the users stored on their PCs and are sent to the servers every time users access the server. This technique obviously has some security and privacy drawbacks.

Every Internet connected PC and server has a unique IP address assigned by their administrator, or by their Internet Service Provider (ISP). By some methods it is possible to create a database of all of these addresses with their geographical location information. By capturing and examining the user data packets, more specifically the source IP address of DNS queries from these users, and by using the mentioned IP address/location database, it would be possible to find out where the users are located in the world. Therefore by using this technique an Internet service provider could determine the user location and customize its content based on that information.

This technology can enable ISPs to supply faster services since they can direct the users to the closest servers. Web portal companies can provide the local news, weather forecast or even local advertisements that belong to user's neighborhood. Online shops can restrict certain goods to be sold to certain countries. Similarly, gambling sites would limit their service to some regions where gambling is allowed. Web sites that provide information in different languages would let the user access the information automatically in the language spoken in user's geographical area.

There are a few implementations of providing content based on users" geo-location. First, it is possible to integrate some software, which has the database of all IP addresses and their locations, to the server. Through this software's application program interface (API) the server determines user's geo-location and modifies or picks the right content based on the user's location. This method obviously has some limitations as it is highly customized for that service only. It requires customized program development and modification of server configuration. In addition, it supports only the service it is integrated and it needs to be installed on every server. Furthermore, not every type of service can be supported by this method due to limitations in some server programs.

Another possible method is using specialized network equipment, which is configured to be the authoritative DNS server of the site. All the DNS queries are directed to it. After it determines the location of the user it directs the user to the closest service site relative to user's location. This method not only requires dramatic modification of the DNS and network setup but also limits the capabilities of the DNS since these equipment are not designed to replace DNS servers. For example they do not support Name Server (NS) records, which are used for delegating the sub domains; zone transfers, incremental updates, and other special resource records.

Therefore a new apparatus and a method are proposed herein to eliminate the shortcomings and limitations of the methods mentioned above while maintaining the DNS functionality with possibly richer feature set.

SUMMARY OF INVENTION

The invention selects the optimum Internet service relative to the geographical location of the Internet user by transparently modifying DNS messages. In one embodiment, the optimum location is the closest one to the user. Mentioned users and services could be located anywhere in the world.

In one embodiment, the invention is implemented in a hardware appliance. It also uses a database of IP addresses with their geographical location in the world. This database is created by consulting some public databases (e.g. WHOIS servers) and by some methods that makes latency, routing and distance computations. The database is updated regularly to reflect the modifications in the Internet.

During the initial setup, every server location that provides the same service around the world is inserted in to the configuration of the invention. The invention then creates a table that maps all the IP addresses from the database to one of the server locations in the world such that the closest server is mapped to each IP address.

In the preferred embodiment, the invention is located in front of the existing DNS server that has IP address records (A records) for all the application servers. Every DNS query coming from users passes through the invention. While examining the data packets, the invention determines the IP address of a user's DNS server that sends the query. Then by referring to the previously computed table the invention modifies the DNS messages to direct the user to the closest server.

The invention works at the second layer of OSI model, examines and modifies only the DNS packets destined to the DNS server of the service. Any other packet is forwarded transparently. This feature of the invention eliminates the need of modifying the configuration of the DNS servers. In addition, it fully supports all DNS operations such as zone transfers, incremental updates, and all types of DNS queries.

Since the locating the service takes place at the DNS level, the invention can be used for any type of Internet service. It also does not require use of APIs, scripts, custom code development, or any configuration change on the application servers.

DETAILED DESCRIPTION

The invention can be implemented in many formats; as a standalone hardware, or as an application integrated with the DNS server on the same platform, or as an application running on the application server. This section provides detailed description of the preferred embodiment, which is the standalone hardware implementation. The detailed functional descriptions herein are representative. The scope of the invention is not limited by this section.

Figure 1:
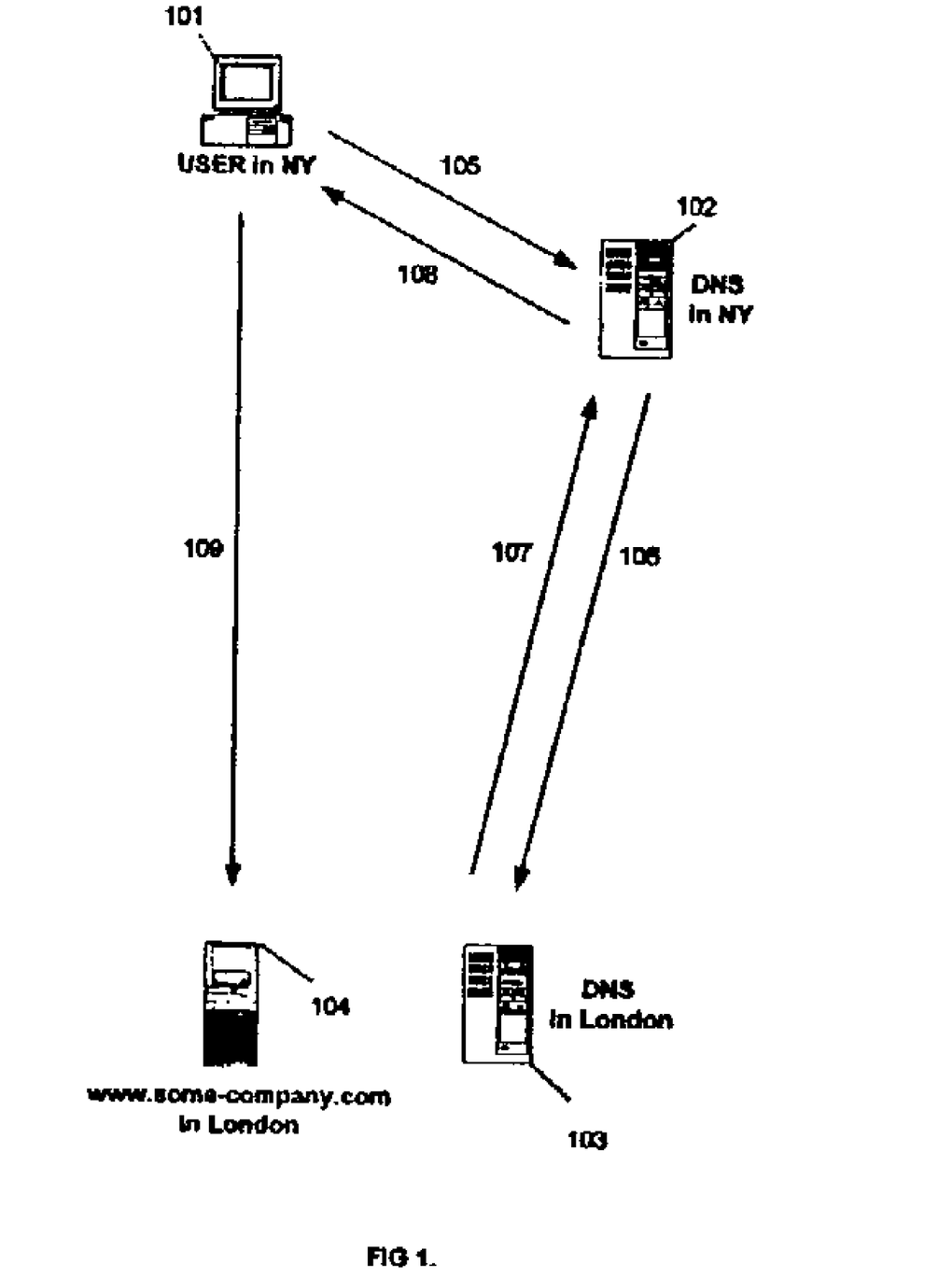
FIG. 1 is a network diagram that depicts an example for the standard way of resolving domain names and locating Internet services.

FIG. 1 shows an example for the standard operation of a domain name resolution. An example user 101 located in New York (N.Y.), which is connected to the Internet through an ISP, wants to access a web site with fully qualified domain name of "www.some-company.com" located in London, UK 104 (the user also could be an employee of a company which is directly connected to the Internet). In order to access this server the user needs to resolve the server's domain name to an IP address. For that, the user's PC sends a DNS query 105 to the user's DNS server 102.

If the user's DNS server 102 does not have an entry for that domain name in its cache, it sends a query to a root DNS server and a gTLD server to locate the authoritative DNS server. If it does have a cache entry from previous queries it answers the query with that entry. Once it finds the authoritative DNS server the user's DNS server 102 sends a query 106 to the service DNS server 103. The query simply asks the IP address of the service "www.some-company.com". Then the DNS server 103 sends a reply message 107 with the correct IP address of the service. After receiving the reply the user's DNS server 102 sends a reply 108 to the original DNS query (105). Upon determining the IP address of the service the user's PC 101 connects (109) to the web server 104 located in London.

The previous example illustrates a typical interaction between the PCs, DNS servers and application servers. As the number of users increase or the users get spread around the world, service providers deploy multiple mirror application servers to maintain the service quality. Let's assume that the service in London (FIG. 1) is duplicated in Washington, D.C. and the invention will be used to select the closest server location.

Figure 2:
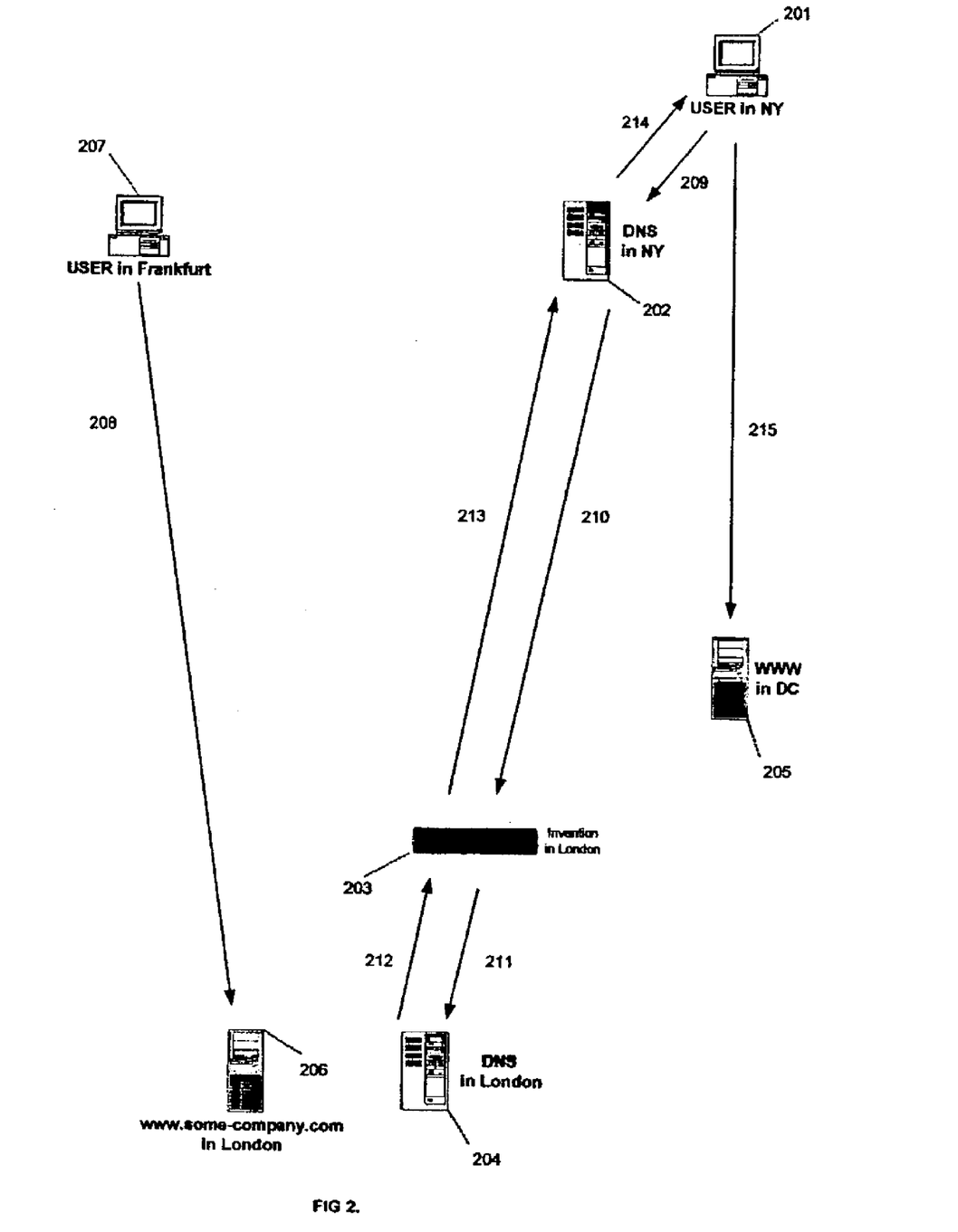
FIG. 2 is a network diagram that shows an example for the use of the apparatus to select the closest Internet service location for the users.

FIG. 2 illustrates this expansion of service coverage. Besides the original web server 206 located in London there is a new mirror server located in DC 205. In addition, the invention 203 is located in front of the DNS server 204 in London.

In order to resolve the IP address of the web server 206, the user in NY 201 consults its DNS server 202 also located in NY. The user 201 sends a DNS query 209 to its DNS server 202. After determining the authoritative DNS server, the DNS server 202 sends a query 210 towards the DNS server in London 204 (assuming there is no cache entry for that domain in the DNS server 202).

The invention 203 is located in front of the DNS server 204 such that every data packet sent to the DNS server 204 goes through it. The invention determines the packet type by parsing the proper fields in the data packets such as the destination IP address, the destination port number, or the DNS message type, etc. If the invention captures a DNS query packet, which is sent to the DNS server 204, it examines the content of the DNS message for further processing. If the packet is not a DNS packet, it is forwarded to the DNS server.

Figure 3:
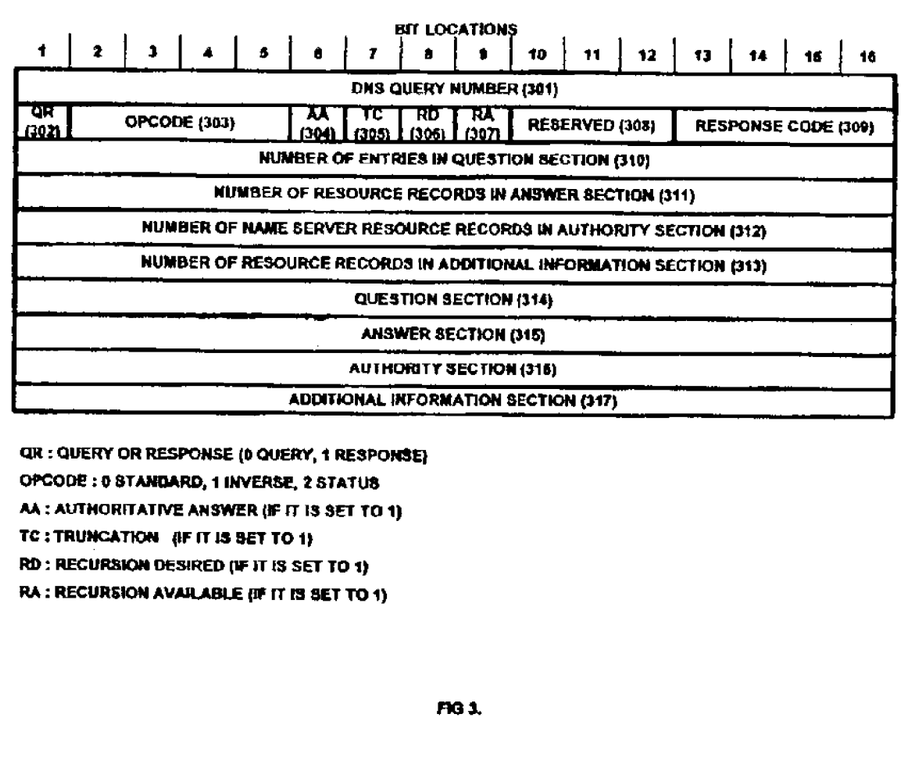
FIG. 3 depicts the format of the DNS protocol message.

FIG. 3 depicts the format of a DNS message. If the QR field 302 in the DNS message is 0 (zero) it indicates that the message is a DNS query. The question section 314 actually has the queried domain name. The answer section 315 is left blank in the query but populated with a proper answer in the response message in which QR 302 is set to 1 (one). The invention 203 also processes other fields to provide correct operation of the DNS service. For example, since each DNS response should have the same DNS Query Number with the query the invention keeps track of each DNS query-response pair by recording the DNS Query Number 301. Also every response message should carry the original Question Section 314 besides the Answer Section 315.

In the preferred embodiment, the invention 203 has two network interfaces: one of them is connected to the DNS server 204 (DNS interface), while the other is connected to the backbone network though which the Internet is accessed (Internet interface).

Figure 4:
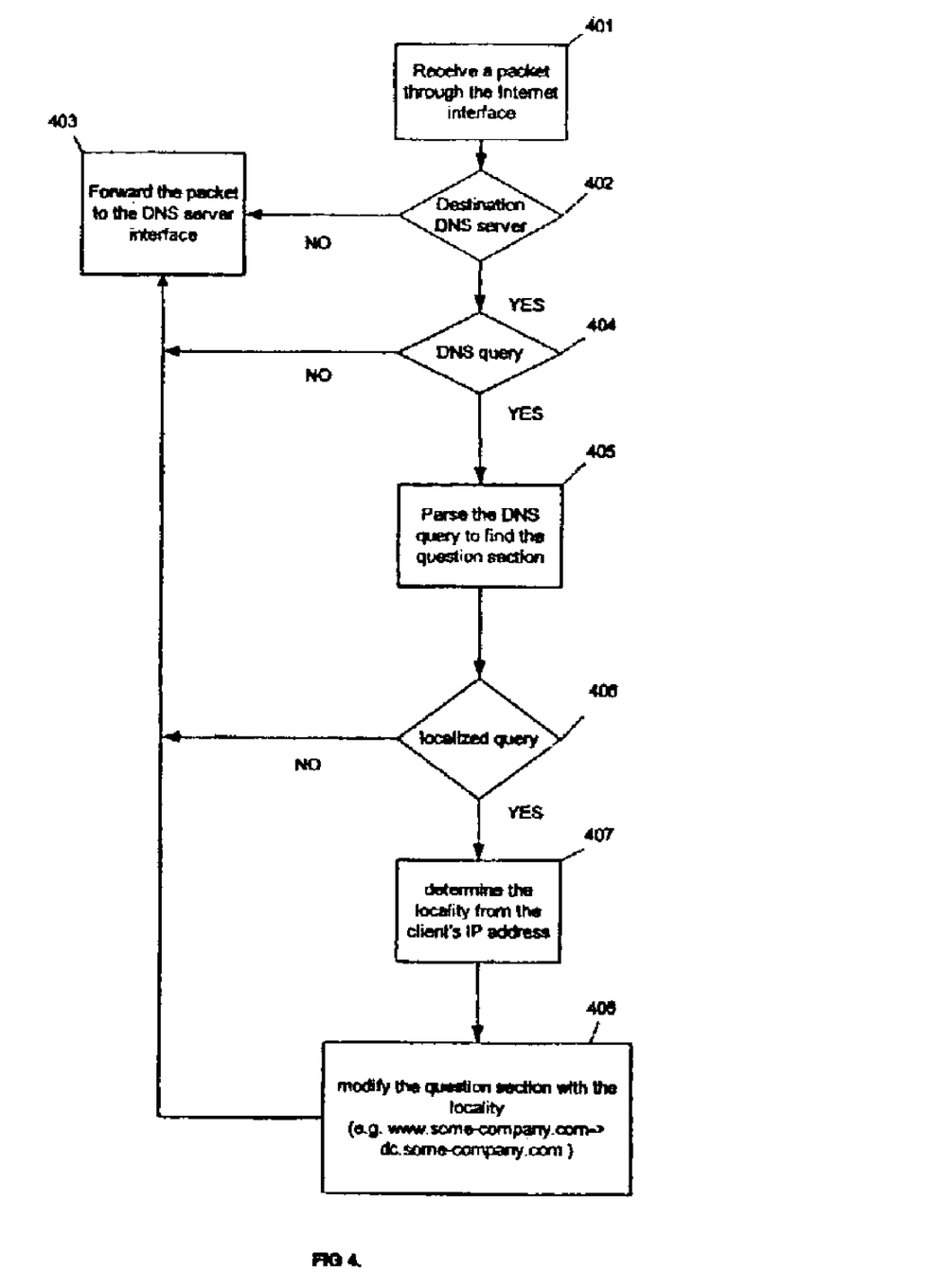
FIG. 4 is a flowchart showing the algorithm used by the invention for processing data packets received at the Internet interface.

FIG. 4 shows the algorithm utilized when a packet is received at the Internet interface of the invention. When a packet is received 401, the invention examines whether it is sent to the DNS server 402, or whether it is a DNS query 404. If the answer is no to any of these questions the packet is forwarded to the DNS interface 403 and sent to the DNS server 204. If it is a DNS query, the Question Section 314 of the DNS message is examined 405. Then this data is checked whether it is the domain name under question 406 (localized query or not). If it is not a localized query then the message is again forwarded to the DNS server interface 403.

If it is a localized query, which is the DNS query for the domain name under question, then the source IP address of the DNS query is determined (407). It is assumed that DNS server 202 is in close proximity of the user 201. After that the invention looks up the IP address/server table to choose the closest server location according to the source IP address of the DNS query. Then the invention modifies the DNS query's question section with the server location. Referring to the example above, the original DNS query, which was asking the IP address of "www.some-company.com", is converted into "dc.some-service.com" 408. After that the packet is forwarded (403) to the DNS server 204.

Figure 5:
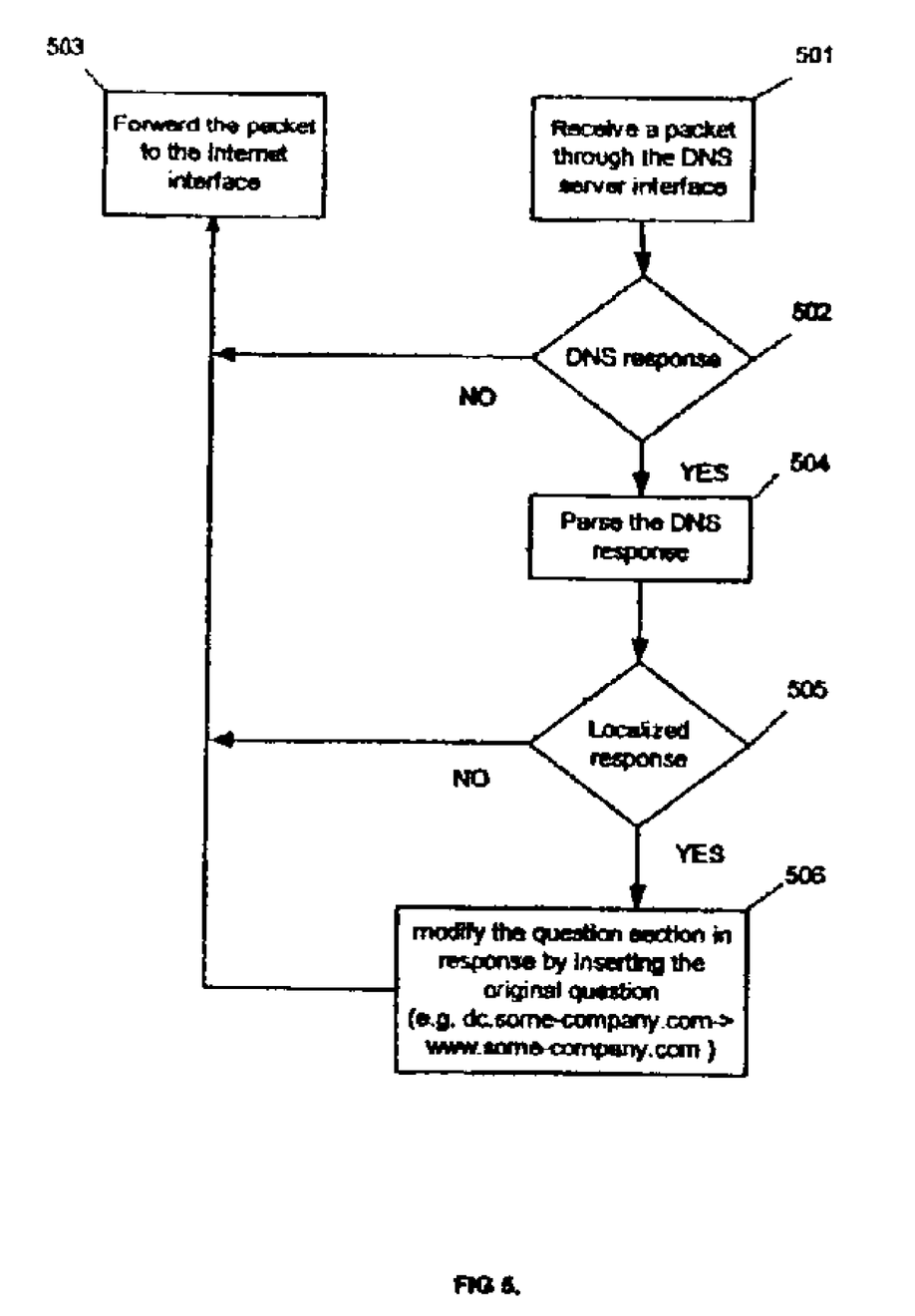
FIG. 5 is a flowchart showing the algorithm used by the invention for processing data packets received at the DNS interface.

Similarly, FIG. 5 depicts the algorithm utilized when a packet is received at the DNS interface of the invention. When a packet is received 501, the invention examines whether it is a DNS response 502. If the packet is not a DNS response, it is forwarded to the Internet interface 503. If it is a DNS response, the invention parses it 504 to check whether the message is a response to a previously processed localized message 505. If the packet is not a localized response message it is again forwarded to the Internet interface 503. If it is a response to a localized query then the Question Section 314 of the response is changed to the original one, for the example mentioned above, from "dc.some-service.com" to "www.some-company.com" 506. Then the response is forwarded to the Internet interface 503.

Referring back to FIG. 2, the invention 203 modifies the DNS query 210 according to the geo-location of the user's DNS server 202. Then it forwards the modified query to the web server's DNS server 204, which has the address records for all the web servers (211). When the DNS server 204 sends a response 212, the invention captures it again. After that the invention modifies the response message accordingly and sends it back (213) to the user's DNS server 202. The user getting the response 214 from its DNS server 202 easily connects (215) to the closer server site in DC 205. Similarly the user located in Frankfurt 207 chooses to connect (208) the server in London 206 due to its closer location.

Figure 6:
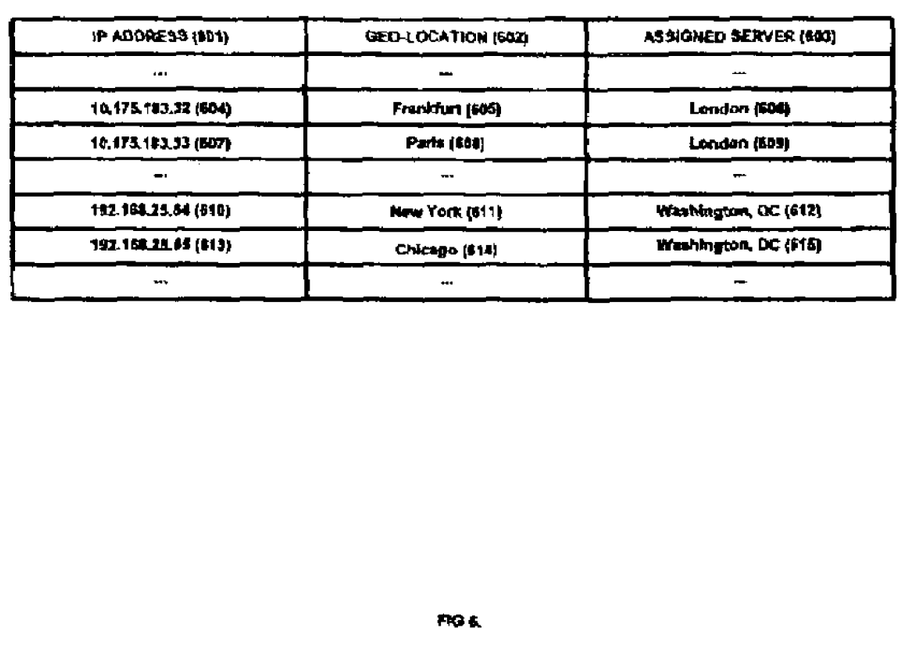
FIG. 6 shows an example for a server table that maps user IP addresses to closest server locations.

FIG. 6 shows a portion of the lookup table used by the invention. The first column 601 has all the possible IP addresses on the Internet. The second column 602 has the corresponding geo-locations which were obtained from the IP address database, while the third one 603 has the assigned servers for each IP address. For example, for the IP address 610, which belongs to the example user DNS server 202, the invention knows that (from the database) the address is located in New York 611. In addition, the invention has assigned the address to the server in DC 612. Therefore the invention modifies the DNS query coming from the user DNS server 202 for the web service 206 in such a way that the DNS response contains the IP address of the server located in DC 612. Hence the user in NY accesses the server in DC 205, which is closer than the one in London 206. Similarly the user 207 whose DNS server's IP address is "10.175.183.32" 604 which is located in Frankfurt 605 accesses the server in London (606), which is closer than the one in DC 204.

The lookup table is created from two inputs; the database that lists all Internet addresses with their geo-locations and the list of geo-locations of the application servers. The IP database is obtained externally and the invention has an appropriate interface to it. Both the IP database and the list of geo-locations of the servers are entered into the invention during the initial configuration. The size and the content of the lookup table are dependent on the service and the distribution of the users. For example, if the invention is going to be used for a web server for Europe only then there is no need to include IP addresses that belongs to Asia.

In one embodiment, the lookup table can be formed by dividing the IP database into equally sized regions. The number of regions would be the same as the number of servers such that each server would be assigned to a region. Any IP address in a region would then be assigned to the server in that region.

In a further embodiment, servers can be assigned weights so that the ones with higher weights would cover larger geographical area. This feature can be used for areas where the Internet user distribution is less populated.

In another embodiment, the invention can be configured in such a way that IP addresses can be manually assigned to certain preferred servers. This technique would provide better control on server utilizations if the IP addresses and the location of the users were known.

Another embodiment of the invention can check the health of the application servers by some methods so that if a server becomes unavailable then the user IP addresses assigned to this server would be re-assigned to the next closest server. When this feature is utilized the invention can provide a very reliable service where the users can always access the service as long as there is at least one server available.

The invention claimed is:

1. An apparatus for selecting the optimum location of a network service based on a user's geographical location and the configuration of the apparatus by transparently altering Domain Name Service (DNS) messages, the apparatus comprising:
   at least two network interfaces, and
   a processor that captures data packets through the network interfaces, analyzes captured packets, determines the user's geo-location, and modifies the question section, the answer section, or both, of DNS messages according to the user's geo-location to direct the user to the optimum server within the network service.

2. The apparatus of claim 1, wherein the optimum location is the geographically closest one.

3. The apparatus of claim 1, wherein the optimum location is that of the geographically closest server, which has been determined to be healthy and actively serving users' requests.

4. The apparatus of claim 3, wherein a healthy server is the one generating timely and correct responses to user requests.

5. The apparatus of claim 3, wherein the optimum location is the preferred location based on specific criteria chosen by a service administrator.

6. The apparatus of claim 1, wherein the location of a network service is one of the locations of many mirrored servers that are connected via a network.

7. The apparatus of claim 1, wherein the network service is an Internet network service.

8. The apparatus of claim 1, wherein the network service is an enterprise network service.

9. The apparatus of claim 1, wherein the configuration of the apparatus is a set of rules to control the optimum server selection process.

10. The apparatus of claim 1, wherein transparently altering DNS messages is performed to capture and to modify the content of the DNS messages by operating at the Open System Interconnection (OSI) model's second layer, which is transparent to Internet Protocol (IP) users.

11. The apparatus of claim 1, wherein the apparatus is attached to networks via said at least two network interfaces.

12. The apparatus of claim 1, wherein the apparatus captures every packet detected on any of its interfaces.

13. The apparatus of claim 1, wherein the apparatus analyzes the captured packets to determine network addresses, protocol port numbers, protocol message types, specific protocol fields, or a combination of these.

14. The apparatus of claim 1, wherein the apparatus comprises a previously built database, and wherein the apparatus determines the source IP address of the captured DNS message and consults its previously built database to determine the geographical location of the user that has sent the DNS message.

15. The apparatus of claim 1, wherein the apparatus modifies the captured DNS messages according to the geo-location of the user, and informs the user of the IP address of the optimum server.

16. The apparatus of claim 1, wherein the apparatus forwards every packet that is not a DNS message to another interface.

17. A method for selecting the optimum location of a network service based on a user's geographical location and the configuration of the method by transparently altering DNS messages, the method comprising:
    capturing data packets,
    analyzing captured packets,
    determining the user's geo-location, and
    modifying the question section, the answer section, or both, of DNS messages according to the user's geo-location to direct the user to the optimum server.

18. The method of claim 17, wherein the optimum location is the geographically closest one.

19. The method of claim 17, wherein the optimum location is that of the geographically closest server, which has been determined to be healthy and actively serving users' requests.

20. The method of claim 19, wherein a healthy server is the one generating timely and correct responses to user requests.

21. The method of claim 17, wherein the optimum location is the preferred location for some users based on some criteria chosen by a service administrator.

22. The method of claim 17, wherein the location of a network service is one of the locations of many mirrored servers that are connected via a network.

23. The method of claim 17, wherein the network service is an Internet network service.

24. The method of claim 17, wherein the network service is an enterprise network service.

25. The method of claim 17, wherein the configuration of the method is a set of rules to control the optimum server selection process.

26. The method of claim 17, wherein transparently altering DNS messages is performed to capture and to modify the content of the DNS messages by operating at the OSI model's second layer, which is transparent to Internet Protocol (IP) users.

27. The method of claim 17, wherein the method analyzes the captured packets to determine network addresses, protocol port numbers, protocol message types, specific protocol fields, or a combination of these.

28. The method of claim 17, further comprising building a database, and wherein the method determines the source IP address of the captured DNS message and consults its previously built database to determine the geographical location of the user that has sent the DNS message.

29. The method of claim 17, wherein the method modifies the captured DNS messages according to the geo-location of the user, and informs the user of the IP address of the optimum server.

30. The method of claim 17, wherein the method forwards every packet that is not a DNS message.

31. A system for selecting the geographically closest server to a user requesting a service from a network, said system comprising:
    at least two servers at geographically different locations in the network;
    at least one DNS server; and
    at least one hardware appliance comprising a database of IP addresses and the respective geographical locations associated with those IP addresses;
    wherein the hardware appliance:
        analyzes all DNS requests directed to a particular DNS server,
        determines the geographically closest server providing the service requested by the user, and
        provides the user the IP address of the geographically closest server that provides the requested service,
    wherein the hardware appliance provides the IP address of the closest server by modifying the DNS request from the user and/or modifying the DNS response from the server by modifying the question section of the DNS request, the answer section of the DNS response, or both, p1 and wherein the hardware appliance is located between the particular DNS server and a network backbone.

32. The system of claim 31, wherein the hardware appliance determines the geographically closest server by consulting the database.

33. The system of claim 31, wherein the hardware appliance:
    modifies a general DNS request for a server providing a desired service by re-writing the request to request a specific geographically located server that provides the desired service, and
    modifies the DNS response to match the original general DNS request.

34. The system of claim 31, wherein the hardware appliance is located between a DNS server and a network backbone.

35. The system of claim 31, comprising multiple hardware appliances.

36. The system of claim 31, wherein each DNS server has associated with it a hardware appliance.

37. A method of altering the DNS request of a user at a specific geographical location who is requesting a service from a network, said method comprising:
    identifying the geographical location of a server serving the user; and
    modifying the question section of a DNS request to request an IP address of a server that provides the requested service, and that is located at an optimal geographic location as compared to the user.

38. The method of claim 37, further comprising:
    modifying a DNS response to match the original DNS request.

39. A method of modifying a DNS response from a DNS server, said method comprising:
    receiving from a DNS server a response comprising an IP address for a specific server at a specific geo-location;
    correlating that IP address with a general request from a user for the IP address of a server providing the requested service; and
    modifying the answer section of a DNS server response to match the general request.

40. The method of claim 39, further comprising, prior to receiving a DNS response from a DNS server:
    receiving a DNS request from a user;
    determining the geo-location of the user by determining the geo-location of the server used by the user; and
    altering the question section of the DNS request from the user from a general request for an IP address of a server providing a desired service to a specific request for a server at a specific location.

41. The method of claim 39, further comprising:
    providing a hardware appliance that performs the recited steps.

* * * * *